March 11, 1924.

W. H. FORSYTH

WOODWORKING MACHINE

Filed Feb. 24, 1923

Inventor:
Wm. H. Forsyth
By Cheever & Cox
Attys

March 11, 1924.

W. H. FORSYTH

WOODWORKING MACHINE

Filed Feb. 24, 1923

Inventor:
W<sup>m</sup>. H. Forsyth
By Cheever & Cox
Attys

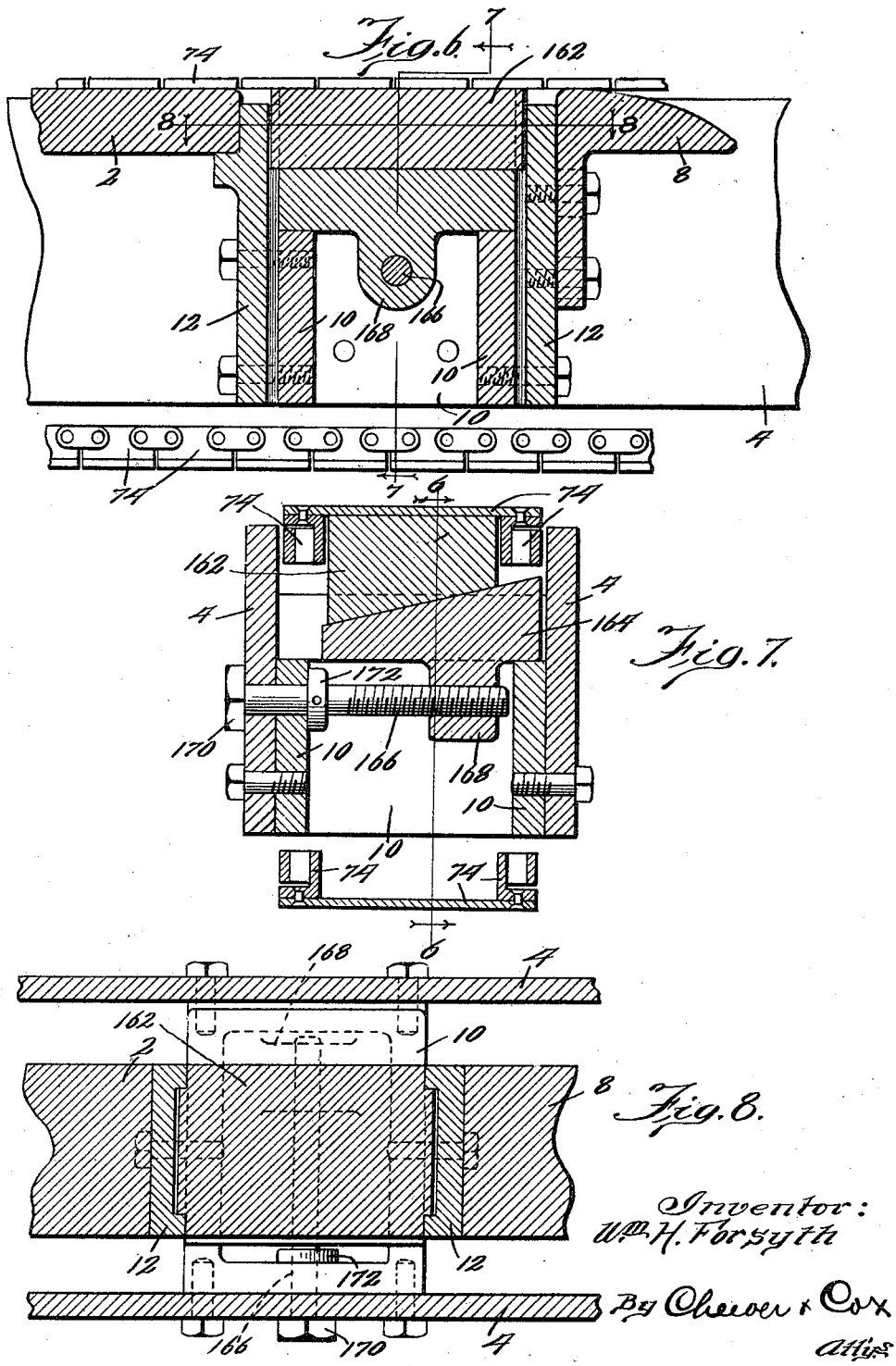

March 11, 1924.
W. H. FORSYTH
WOODWORKING MACHINE
Filed Feb. 24, 1923
1,486,288
9 Sheets-Sheet 7
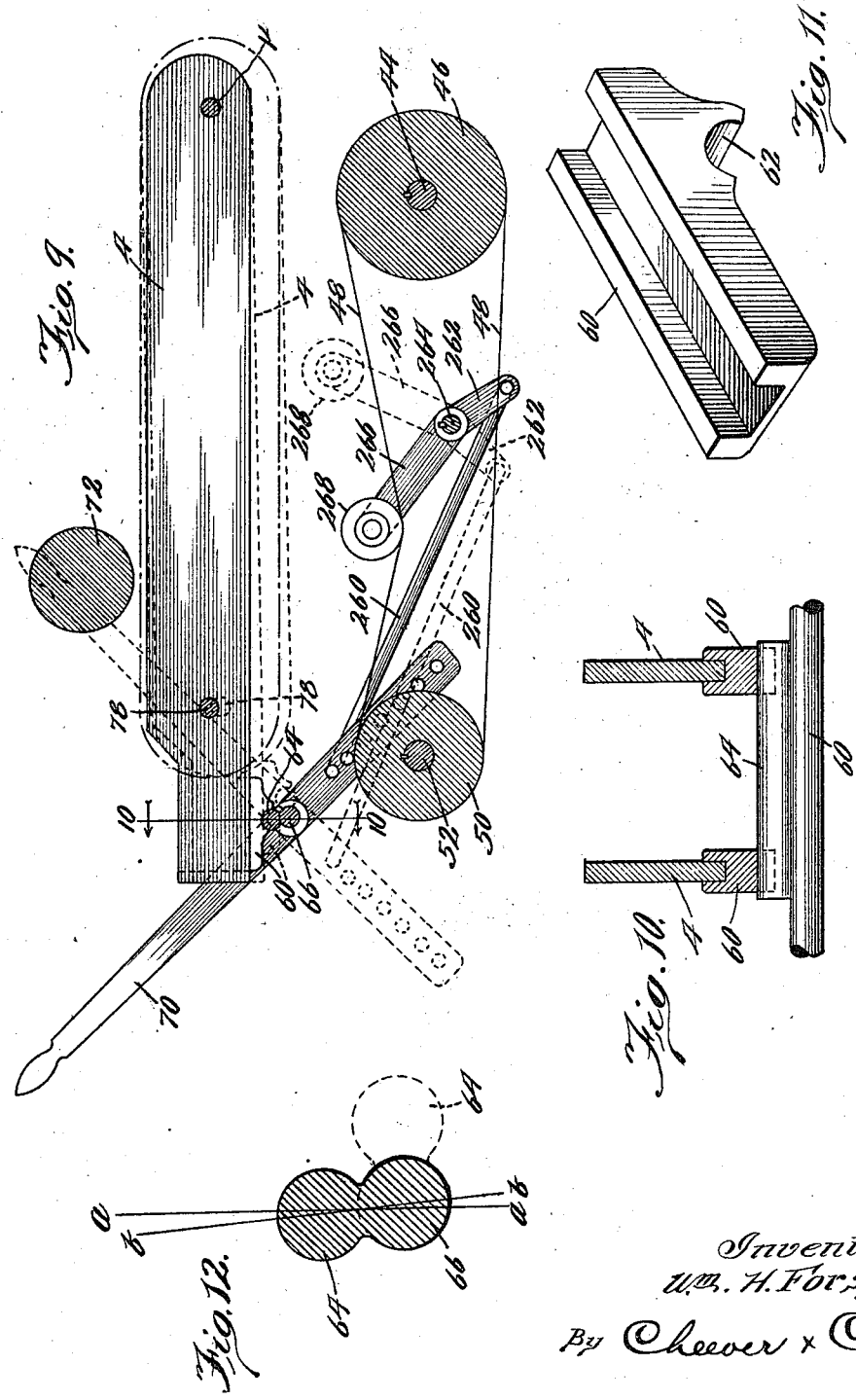

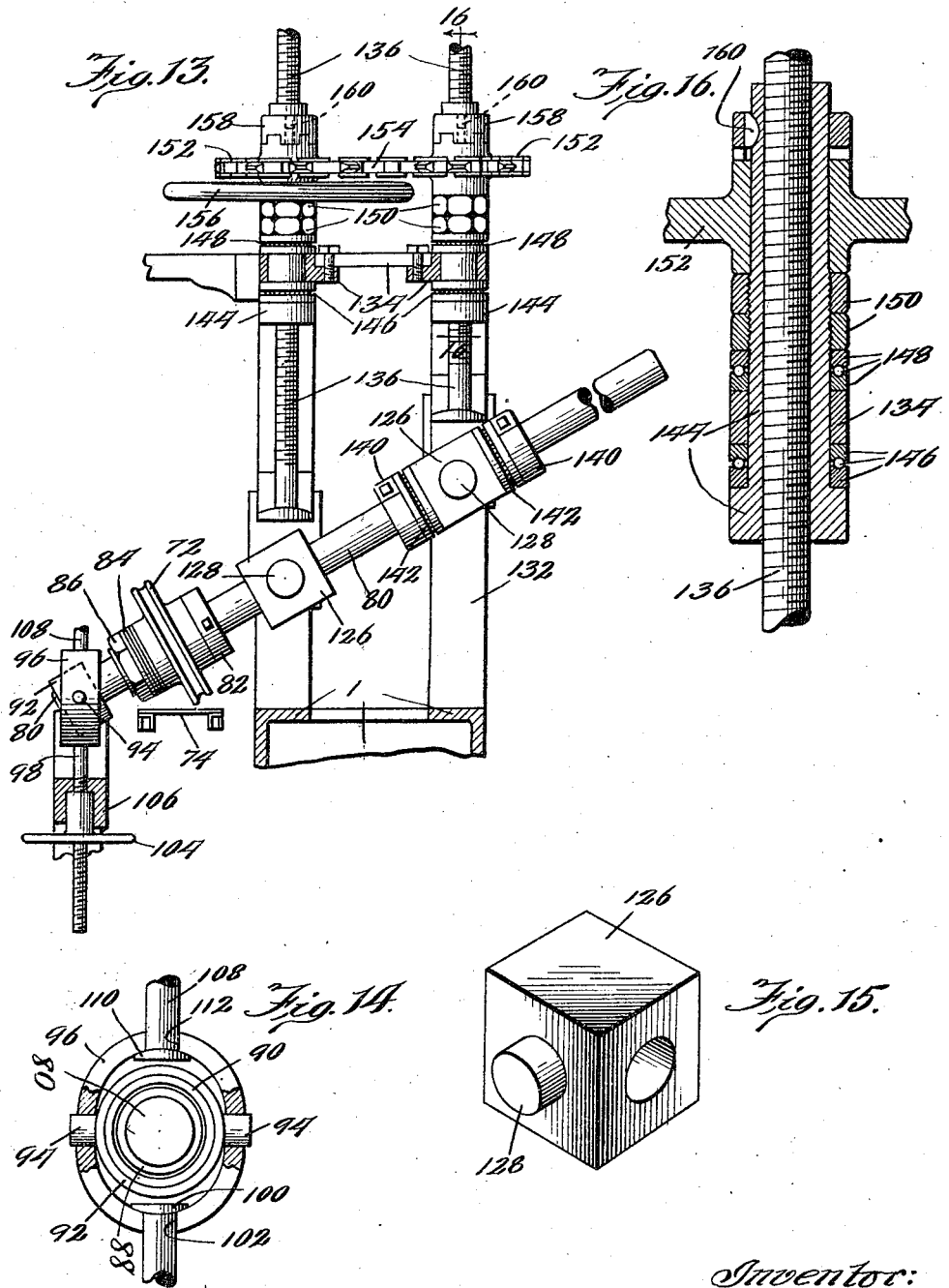

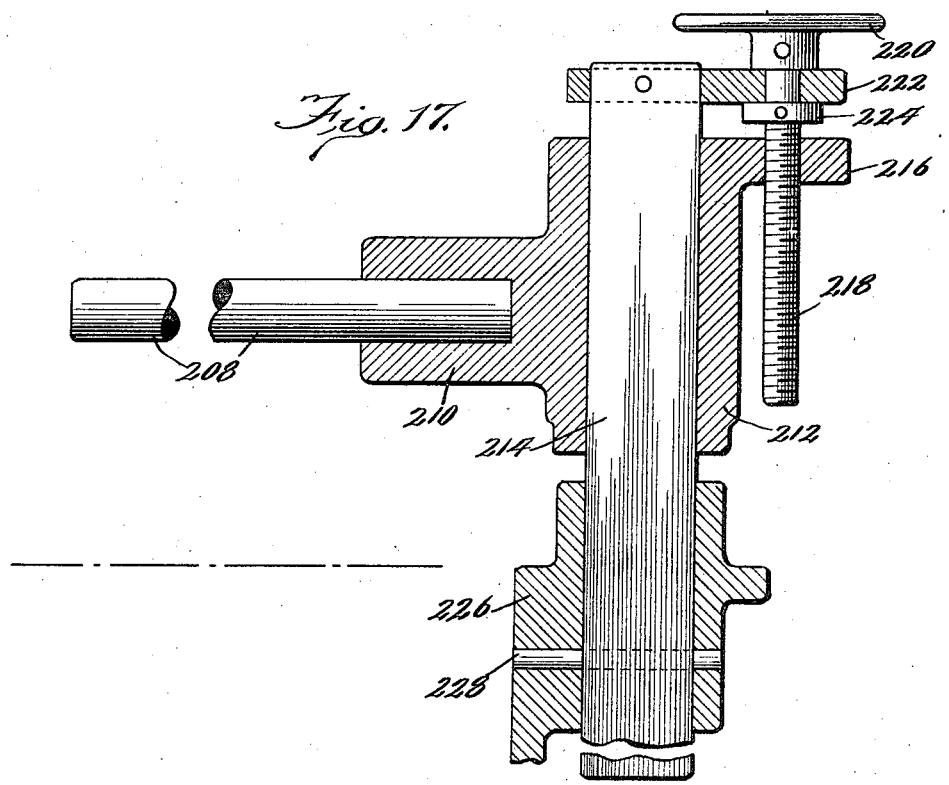
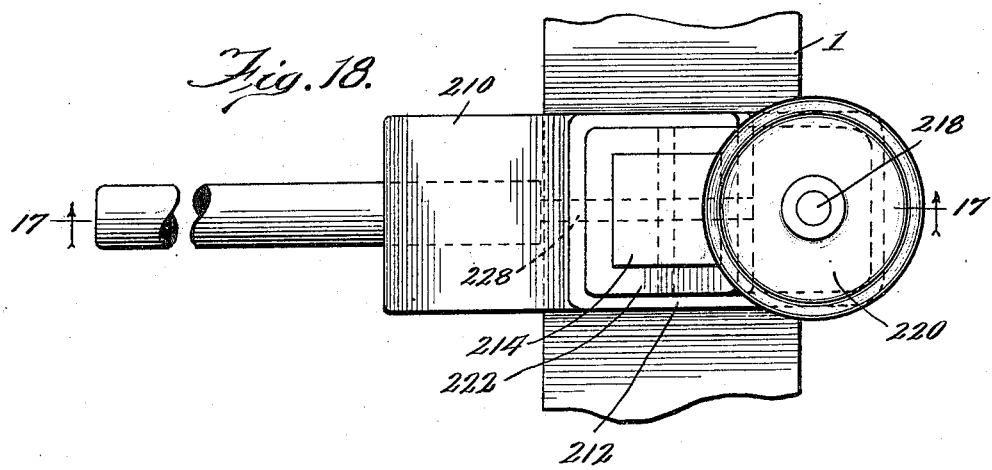

Patented Mar. 11, 1924.

1,486,288

UNITED STATES PATENT OFFICE.

WILLIAM H. FORSYTH, OF CHICAGO. ILLINOIS, ASSIGNOR TO BOYNTON & CO., OF CHICAGO, ILLINOIS, A CORPORATION OF ILLINOIS.

WOODWORKING MACHINE.

Application filed February 24, 1923. Serial No. 620,874.

*To all whom it may concern:*

Be it known that I, WILLIAM H. FORSYTH, a citizen of the United States, residing at Chicago, in the county of Cook and State of Illinois, have invented a certain new and useful Improvement in Woodworking Machines, of which the following is a specification.

My invention resides in a woodworking machine and in its developed form combines the characteristics of an embossing machine and of a planer. One of the objects of the invention is to provide a machine through which the wooden strip may be passed and in which it will be embossed at one point of its journey and planed at another point, the entire operation thus occurring in a single unitary organization. Another object of the invention is to provide a machine in which the embossing may be done at any desired angle. Still another object is to provide means by which the embossing roll and the work may be quickly and effectively brought out of engagement with each other, this quick release being initiated by hand and thereafter carried on automatically. The purpose of this quick and semi-automatic release is to prevent the machine from jamming in case the wood is knotty or splintered or is otherwise unfit to pass through the machine. Still another object of the invention is to provide means whereby when the release occurs the machine will be automatically and promptly stopped. Another object is to provide efficient and easily operated means for regulating the pressure of the embossing roll on the work. Another object is to provide certain details of construction by which the foregoing effects may be produced and also by which various adjustments may be made.

I accomplish my objects by the mechanism illustrated in the accompanying drawings in which—

Figure 3 is a side elevation from the rear side of the machine.

Figure 1:
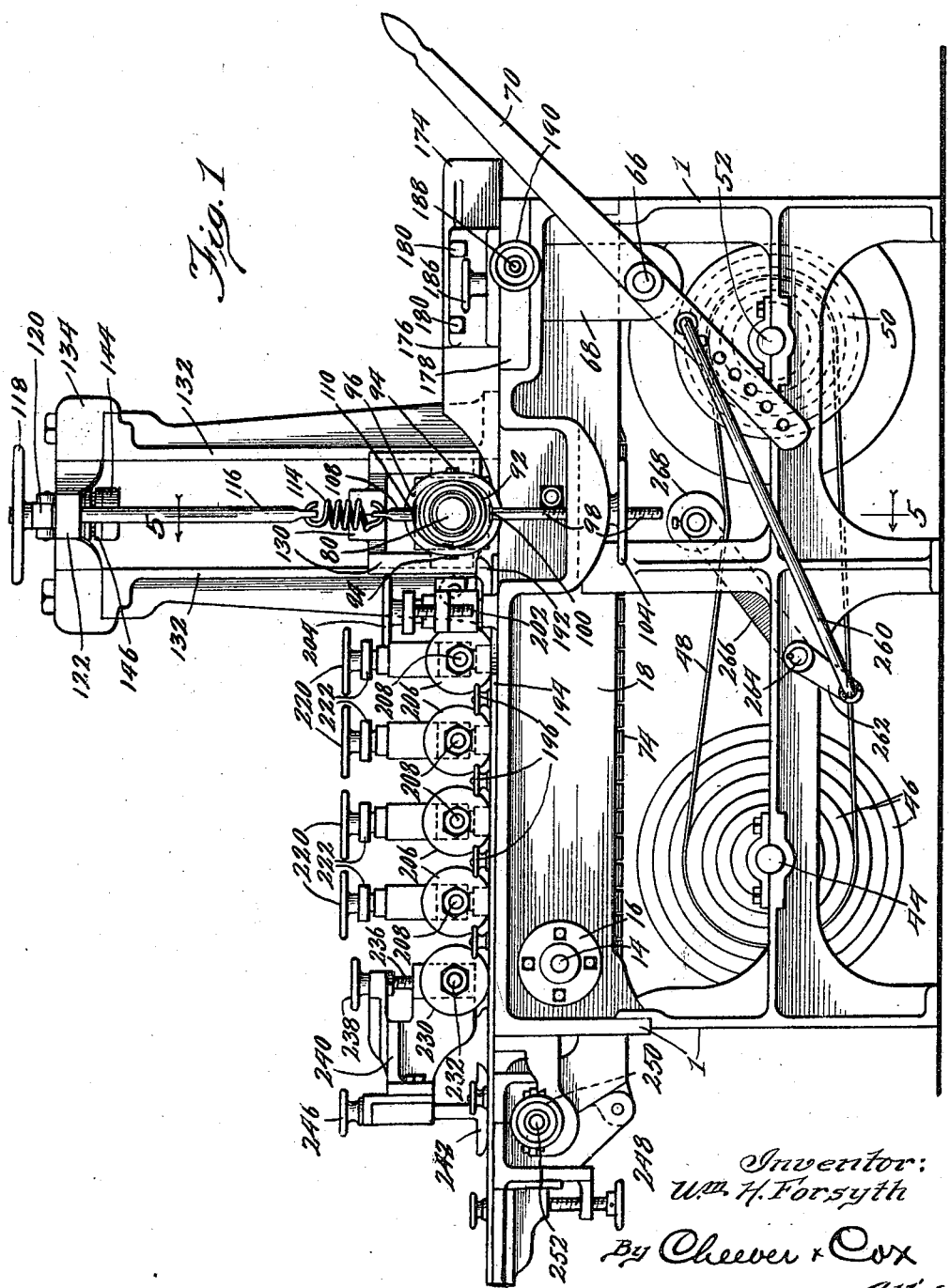
Figure 1 is a side elevation of the complete machine from the operator's side. This may be regarded as the front side.

Figure 6 is a sectional detail of the pressure adjusting mechanism under the embossing roll. The view is similar—so far as it goes—to the one shown in Figure 4. The plane of section is indicated by the line 6—6, Figure 7.

Figure 7 is a sectional elevation on the line 7—7, Figure 6.

Figure 8 is a plan section on the line 8—8, Figure 6.

Figure 9 is a diagrammatic view illustrating the operation of the releasing mechanism, by means of which the pressure of the embossing roll is released and the machine brought to a stop.

Figure 10 is a sectional detail on the line 10—10, Figure 9.

Figure 11 is a perspective view of one of the bearing plates which form part of the releasing mechanism (which is illustrated diagrammatically in Figure 9).

Figure 12 is a sectional detail showing the eccentric which forms part of the releasing mechanism—which is shown diagrammatically in Figure 9. In this figure the full lines show the position of the eccentric when the machine is in operating position, and the dotted lines show the eccentric when released.

Figure 13 is a detail showing the mechanism by which the embossing shaft and roll may be tilted to various angles.

Figure 14 is a detail showing the trunnion bearing which supports the pivoted end of the embossing shaft.

Figure 15 is a perspective view of one of the trunnion blocks.

Figure 16 is a sectional elevation on the line 16—16 Figure 13.

Figure 17 is an enlarged detail section of the mechanism by which the pressure rollers hold the embossed molding down in contact with the conveyor belt. The plane of section is indicated by the line 17—17, Figure 18.

Figure 18 is a plan view of the parts shown in Figure 17.

Like numerals denote like parts throughout the several views.

In the form selected to illustrate the invention the machine has a main frame which will be indicated in general by the reference numeral 1. Mounted in the upper part of this frame is a pressure table which, according to the present design, has a top 2 supported on two parallel sides 4, secured together at intervals by cross braces 6. The table top has an extension 8 at the receiving end of the machine (shown, for example, at the left end of Figure 3). A "box" 10 also contributes in holding the sides 4 and other parts in position (see Figure 4 and Figures 6 to 8). The parts are also held assembled by vertical guide plates 12. These parts 2 to 12 may be taken collectively as comprising the table which supports the conveyor or feed belt presently to be described.

Figure 2:
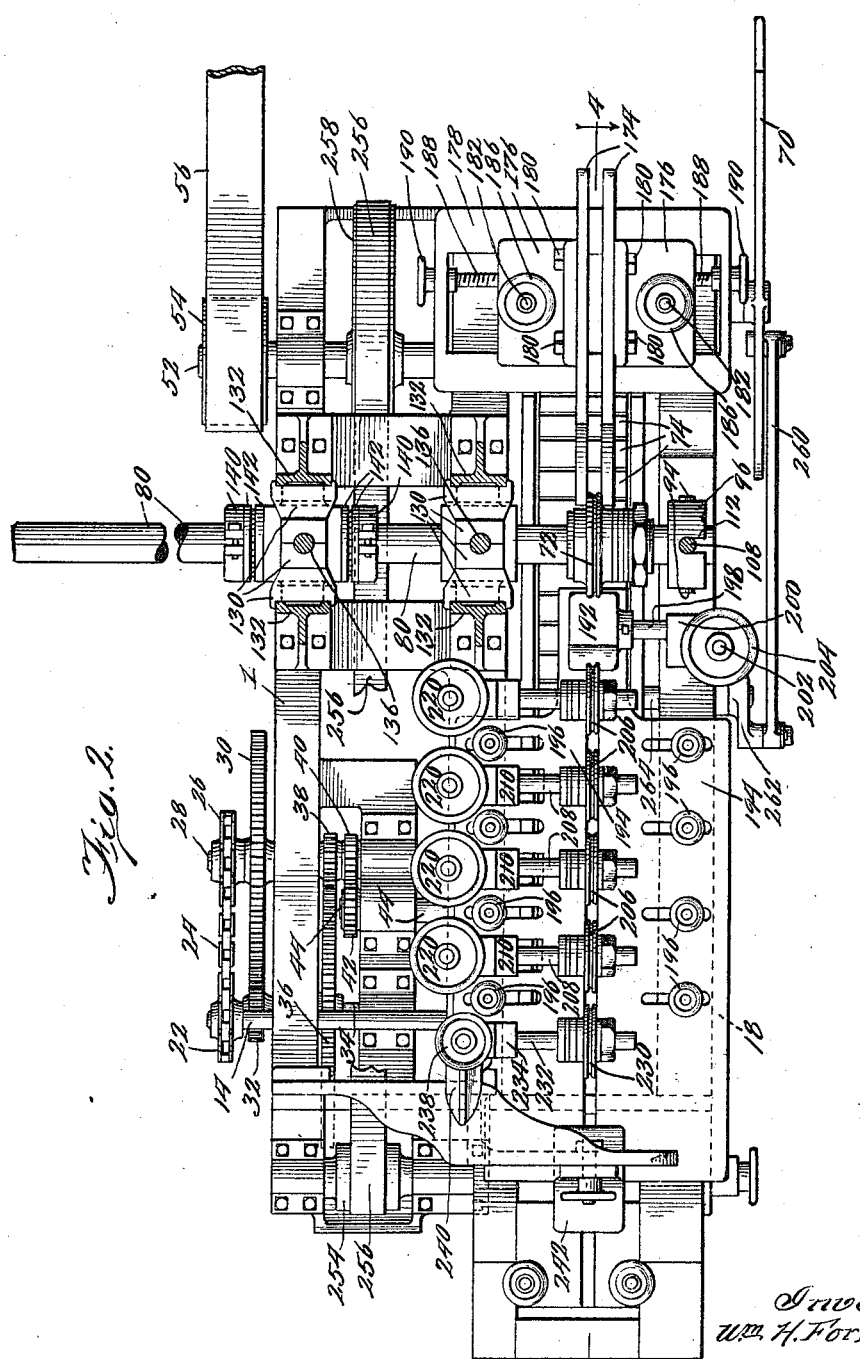
Figure 2 is a top plan view of the machine.

The rear end of the pressure table is supported by a shaft 14 journaled in bearings 16 mounted on the sides 18 of the main frame 1. This shaft forms not only a support and pivot for the rear end of the pressure table but also constitutes a driving shaft for driving the sprocket 20 which is rigidly secured to it. This shaft 14 is driven by a sprocket 22 connected by a link belt 24 to a sprocket 26 loosely mounted on a shaft 28 journaled in the lower portion of the main frame of the machine. Sprocket 26 is rigidly fastened to a gear 30 which is also loosely mounted on shaft 28. Gear 30 meshes with a pinion 32 fastened to a stub shaft 34 which is driven by a gear 36 as best shown in Figures 2 and 3. Gear 36 is rigidly mounted on shaft 34 and is driven by a pinion 38 which is rigidly mounted on shaft 28 and is driven by a pinion 40, which is also mounted rigidly on shaft 28. Pinion 40 is driven by a pinion 42 which is rigidly mounted on a shaft 44. Shaft 44 is driven by a bank of belt-driven pulleys 46 which are rigidly mounted on it. Pulleys 46 are driven by a belt 48, which in turn is driven by a bank of pulleys 50. Pulleys 50 are rigidly mounted on shaft 52, which is driven by main drive pulley 54 and drive belt 56, the latter being shown at the right end of Figure 2 and the left end of Figure 3. While I have described the illustrated driving gear train in considerable detail it will be understood that any other suitable form of power transmission or reduction gearing may be substituted with like effect. It will also be understood that any desired driving ratio may be obtained by a suitably changing proportion of the intermediate gears or pulleys.

Figure 4:
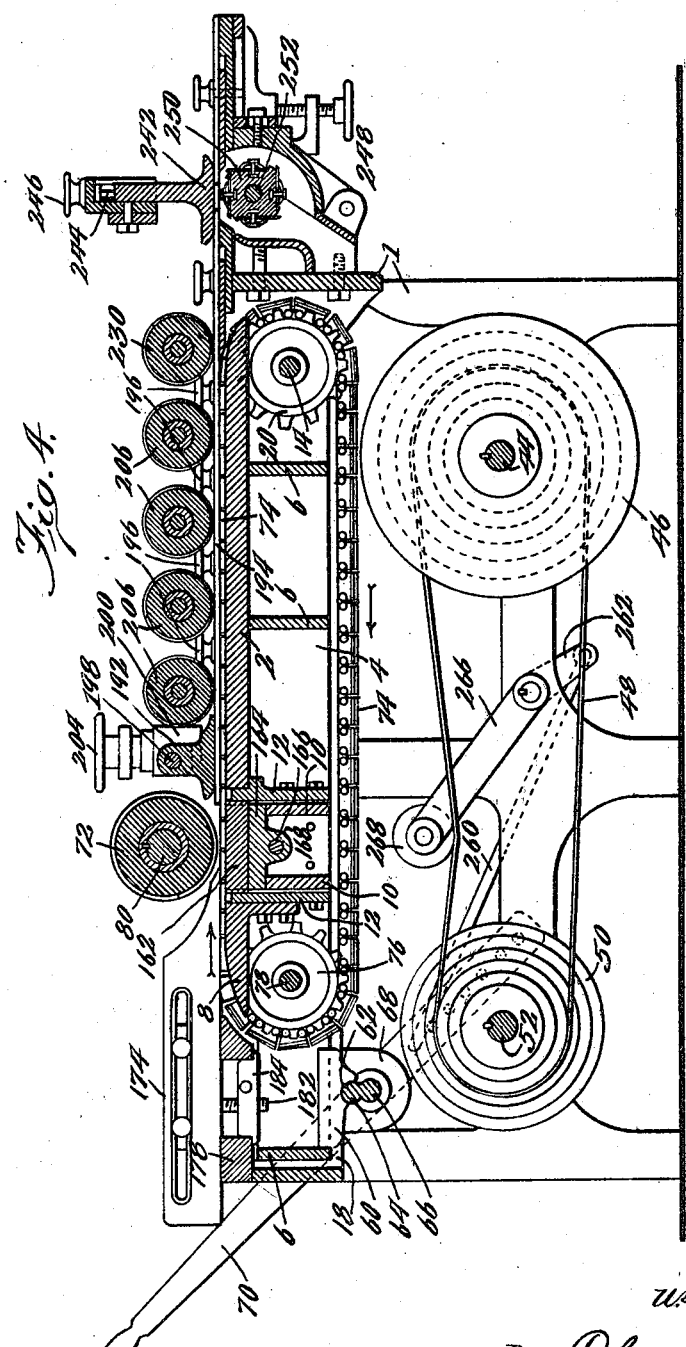
Figure 4 is a sectional elevation on the line 4—4, Figure 2 looking in the direction of the arrows—that is, from the rear side of the machine.

Referring again to the pressure table which is pivotally supported at its rear end by shaft 14 which passes through the side frame members 4 on which the table top rests:

The forward end of this table is supported upon a vertical adjusting mechanism shown in general near the left end of Figure 4 and diagrammatically in Figure 9. Slidably mounted on the under side of the side members 4 of the table are two bearing blocks 60 shown in section in Figure 10 and in perspective in Figure 11. These blocks have bearing surfaces 62 on the under side which rest upon the upper rounded portion 64 of eccentric shaft 66. Shaft 66 is journaled in hangers 68 secured to the side frames 18 as shown, for example, at the right end of Figure 1. By reference to the diagram Figure 9 and also Figures 4 and 12, it will be evident that the rotation of shaft 66 will cause a raising or lowering of the forward end of the pressure table, depending upon the direction in which the shaft is rotated. This shaft is manually controlled by means of a hand lever 70. The construction is such that in the normal operating position shown in full lines in Figures 4, 9 and 12 the table will be held elevated when the eccentric 64 is rotated to the position shown in dotted lines in Figures 9 and 12, the table end will be lowered. This will release the pressure on the under side of the conveyor and hence the pressure of the work against the embossing roll 72 hereinafter again referred to. The formation and arrangement of the parts are such that when in normal operating position the eccentric 64 will lie slightly past center thus locking the table in elevated position. This will be clearly understood by referring to Figure 12 where the vertical position is indicated by the line $a$—$a$ and the overthrown or locked position by the line $b$—$b$.

The controlling lever 70 performs another function, viz, to cause the stoppage of the machine when the pressure is released, but this will be described in connection with the work conveyor now to be described.

Figure 5:
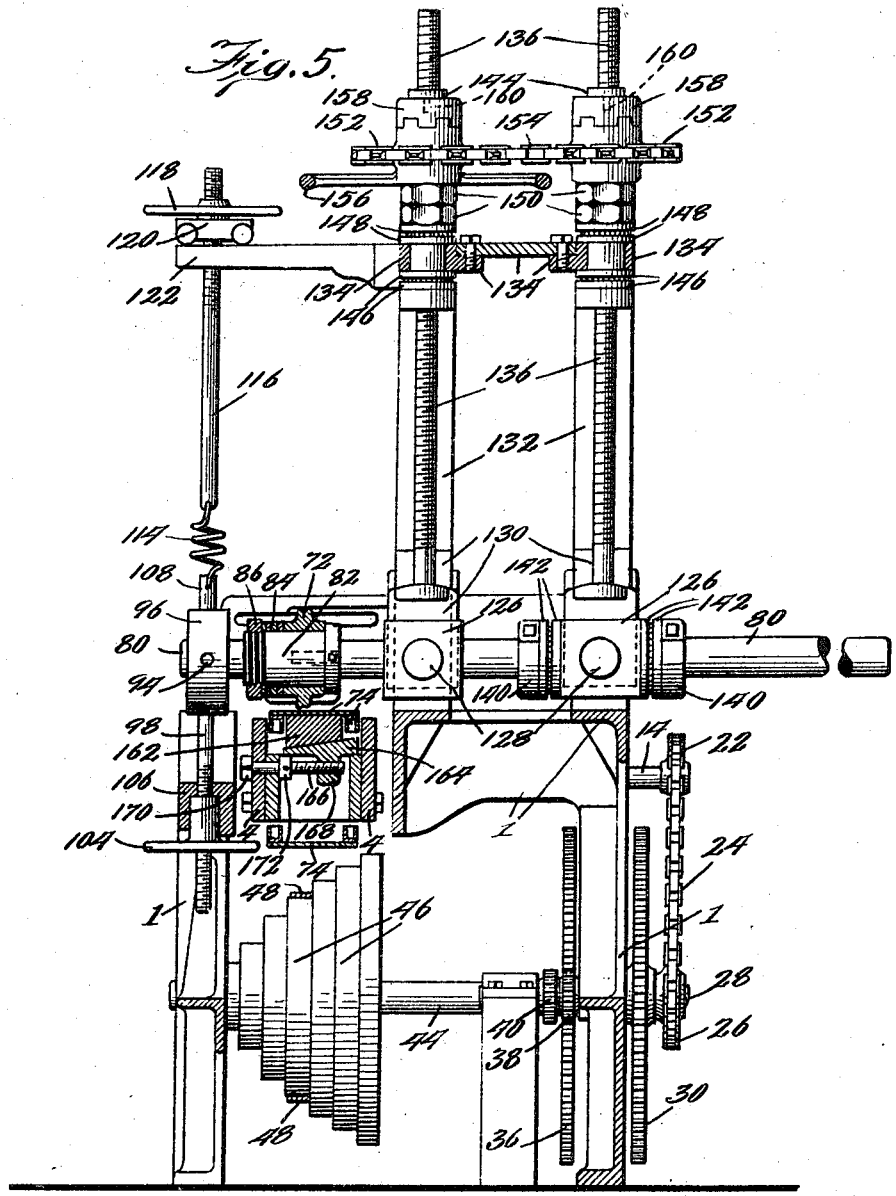
Figure 5 is a sectional elevation on the line 5—5, Figure 1.

The work (that is, the molding strip) is caused to progress through the machine by a belt conveyor indicated in general by the reference numerals 74. The upper surface of the conveyor elements is fluted or otherwise roughened so as to insure that the work will travel through the machine. At one end this conveyor passes over sprockets 20 previously mentioned. At the forward end of the machine the conveyor passes over sprocket 76 best shown in Figure 4. The sprockets 76 are mounted on a shaft 78 journaled in the sides 4 of the pressure table. In practice the upper run of this endless conveyor travels from the front toward the rear end of the machine as indicated by the arrows, Figure 4. The embossing roll is located over the forward, vertically movable end of the pressure table and is held rigidly in any desired position, both vertically and angularly, by mechanism best shown in Figures 3, 5 and 13 to 16. While the design may be varied, in the present case the embossing roll is rigidly secured to the shaft by means of a sleeve 82 which is keyed to the shaft and passes through the hub of the roll. The roll is held rigidly on the sleeve by means of shims 84 and a lock nut 86, which latter screws onto the threaded end of the sleeve. Shaft 80 is pivoted at its outer end by means of a trunnion ball bearing. The outer end of the shaft fits tightly in a ring 88 which forms the inner raceway of a ball or roller bearing. (See, for example, Figure 14). The outer raceway 90 is mounted in a trunnion ring 92 having trunnions 94 projecting laterally and journaled in a yoke 96. This yoke is rigidly held against upward movement by the adjustable rod 98 which has a head 100 which fits into a slot 102 at the lower portion of the yoke. The lower end of this rod is threaded and works in an internally threaded hand wheel 104 which abuts a stationary frame member 106. The yoke is supported at the upper end by a rod 108 which has a head 110 fitting into a slot 112 in the yoke. This rod 108 is supported upon a tension spring 114 which in turn is suspended from the lower end of a rod 116. The upper end of this rod is threaded and works within an internally threaded hand wheel 118, which seats upon a trolley 120 adapted to travel, for adjustment, on a stationary bracket 122 shown at the left end of Figure 5. Shaft 80 has two other bearings which are vertically adjustable independently of each other. They are shown in Figure 5 in position to hold the shaft horizontal and in Figure 13 to hold it at an oblique angle. The supporting and adjusting means include two bearing blocks 126 shown in perspective in Figure 15. These blocks have trunnions 128 projecting from both sides which are mounted in a crosshead consisting of two members 130 slidably mounted in upright guides 132 shown in Figures 1, 3, 5 and elsewhere. A bridge composed of parts 134 connects the guides at the top and forms a rigid support for rotatable adjusting screws 136, the lower ends of which are swiveled to the members 130. In order to prevent the shaft 80 from shifting lengthwise within its bearings thrust collars 140 are clamped to the shaft and confine ball thrust bearings 142 between the clamps and the ends of the block 126.

Now referring to the mechanism for controlling the vertical position of the adjusting screw 136; by reference especially to Figure 16 it will be observed that a long sleeve 144 is internally threaded to work on each of the adjusting screws. The lower end of the sleeve is shouldered to support a ball thrust bearing 146. Above this is located the stationary bridge member 134 previously mentioned. Resting upon the bridge member is a ball thrust bearing 148 and these parts are clamped down by two lock nuts 150 which screw onto the threaded outside of the sleeve 144. Loosely mounted on the sleeves 144 above the lock nuts 150 are sprockets 152 which are connected by a chain 154 so that they always rotate in unison. Formed on the hub of one of these sprockets is a hand wheel 156 by which it may be rotated. The upper ends of the hubs of the sprocket wheels are equipped with clutch members adapted to cooperate with companion clutch members 158 which are keyed to sleeves 144 by means of keys 160. These clutch members 158 are vertically slotted internally, so as to be vertically movable out of engagement with the key. Thus by unclutching the members, either one of the sprockets may be rotated independently of the adjusting screw on which it is mounted. By lowering the upper clutch members 158 into engagement with the lower clutch members the sprockets and adjusting screws will rotate in unison. It will be evident that by throwing the clutches in and rotating the hand wheel 156 the screws may be made to rotate in unison. The adjusting mechanism for shaft 80 operates as follows:

If it is desired to raise or lower both of the bearing blocks 126 in unison the clutch members 158 will both be lowered to acting position. Then by rotating the hand wheel 156 both adjusting screws 136 will operate in unison and the shaft will be raised or lowered without changing its angle of inclination. If it is desired to vertically adjust the bearing blocks 126 independently of each other, it may be accomplished by rotating the hand wheel and properly manipulating the clutch members 158.

Now referring to the mechanism which controls the amount of pressure with which the work is forced against the under side of the embossing roll: directly underneath the axis of shaft 80 on which the embossing roll is mounted is a platen 162 which forms a component part of the pressure table. It is vertically adjustable independently of the rest of the table and forms a bearing or backing for that section of the conveyor or feed chain which is temporarily beneath the embossing roll. Platen 162 is vertically movable within and guided by the frame members 12 as shown in Figure 4 and in detail in Figures 6 and 8. The platen has an inclined bottom surface which rests upon a correspondingly inclined upper surface of a wedge block 164. This block is transversely slidable with the result that by shifting it in one direction or the other, it may raise or lower the platen and consequently raise the conveyor toward or lower it away from the embossing roll, thus decreasing or increasing the pressure of the roll upon the work. The position of the block 164 is controlled by an adjusting screw 166, which is threaded to work in the lug 168 formed on the bottom of block 164. This screw is journaled in one of the side members 4 and is provided with a polyangular head 170 by which it may be rotated. A collar 172 is fastened to the screw on the opposite side of the frame member and thus cooperates with the head to prevent longitudinal movement of the adjusting screw.

As the work enters the machine it passes between a pair of guides 174 here shown in the form of slotted plates arranged in a vertical plane and held by angle brackets 176, which rest upon the bed plate 178 which forms part of the main frame of the machine. These guides are held in proper position, lengthwise, by means of bolts 180 or other appropriate means. The angle brackets 176 are clamped to the bed plate by clamping bolts 182 which screw into clamping blocks 184 as best shown at the left end of Figure 4. These bolts are rotated by hand wheels 186. The angle brackets 176 are transversely slidable on the bed plate 178 and their position upon said table is controlled by adjusting screws 188 provided with hand wheels 190.

As the work leaves the embossing roll it passes under a shoe 192 shown in section in Figure 4 and between two guide plates 194. These latter are shown in plan in Figure 2. The guide plates are transversely slotted to accommodate clamping bolts 196, consequently they can be adjusted laterally to accommodate molding of different widths. Shoe 192 is mounted on a shaft 198, which is mounted in a block 200 which is vertically adjustable by means of an adjusting screw 202 and hand wheel 204 by which it may be rotated. The function of this shoe 192 is to hold the work down in contact with the conveyor and prevent the molding from curling or warping, as it would otherwise be apt to do upon leaving the embossing roll.

Located beyond the shoe 192 is a set of rollers 206 whose function is to press the molding down onto the conveyor and cooperate with it to advance the molding through the machine. These rollers are here shown to be four in number, and to be vertically adjustable by mechanism shown in detail in Figures 17 and 18. Each roller is mounted upon a shaft 208 projecting from a boss 210 formed at the side of a sleeve 212 which is vertically slidable upon a square post 214. A bracket 216 projects from the side of each sleeve and is internally threaded to take an adjusting screw 218. This screw is rotated by a hand wheel 220, the hub of which rests upon a stationary bracket 222 pinned or otherwise rigidly secured to the upper end of shaft 214. A collar 224 is pinned or otherwise rigidly secured to the adjusting screw beneath the bracket 222 and the result is that when the screw is rotated it will control the vertical position of the sleeve 212 relatively to the post 214. At the lower end each post is rigidly secured to a boss 226 which forms part of the main frame. The posts are rigidly fastened to the bosses by means of pins 228 or other fastening devices. The advantage of employing a squared post in this situation is to make certain that the pressure rollers will always keep in perfect alignment with the work as the latter passes beneath.

At the final end of the series of pressure rollers 206 is a supplemental pressure roller 230. Its function is similar to that of the preceding rollers and while the particular manner of mounting it is not essential, in the present construction the shaft 232, on which it is mounted, is mounted in a block 234 which is vertically adjustable by means of an adjusting screw 236, which is controlled by means of a hand wheel 238. The adjusting screw is mounted in a bracket 240 rigidly mounted on the main frame of the machine. Bracket 240 also forms a support and guide for a supplemental shoe 242 shown at the left end of Figure 1 and the right end of Figure 3. This shoe is vertically adjustable by means of an adjusting screw 244 shown at the right end of Figure 4 and a hand wheel 246 which cooperates with said screw and rests upon the top of the bracket.

The main frame has an extension at the rear end indicated in general by the numeral 248. This is bolted to the main frame 1 and carries a revolving planer head 250 mounted on a shaft 252. This shaft is journaled in the extension and is located approximately beneath the shoe 242. The table above the planer head is slotted in order to afford access to the under side of the molding. The result is that the molding is planed on the under side before it leaves the machine. The planer head is driven by a shaft 252, which is equipped with a belt pulley 254 driven by a belt 256. The belt in this particular instance is crossed, and is driven by a pulley 258 fastened to the shaft 52, previously mentioned.

Now referring to the mechanism which causes the machine to stop when the pressure is released; lever 70 is extended beyond rock shaft 66 and is there connected to a link 260 shown, for example, near the bottom of Figures 1 and 9. The rear end of the link is connected to an arm 262 which is keyed or otherwise rigidly secured to a shaft 264. Mounted on the shaft 264 is another arm 266 which at its upper end carries a loose pulley 268, which operates as a belt tightener. The diagrammatic view Figure 9 clearly shows the inter-relation of the parts. When the parts are in operating position shown in full lines the eccentric mechanism 66, 64 will hold the forward end of the table and conveyor elevated, and will at the same time hold the pulley 268 down on the belt 48 and depress and tighten it. Under these conditions the belt will transmit power from the driving shaft 52 to the driven shaft 44. If the machine jams or for any other reason it is desired to quickly release the pressure and stop the machine the operator throws lever 70 a slight distance toward the right Figure 9. After the eccentric 64 has moved past the center, the pressure of the embossing roll 72, plus the weight of the table 4, will cause the eccentric to continue its angular movement, thus throwing the lever 70 to the position shown in dotted lines. This movement of the lever also causes the link 260 to rotate the rock shaft 264 in such manner as to bring the belt tightener pulley 268 from the position shown in full lines to the position shown in dotted lines, where the belt will be loosened, thus letting the belt slip and the machine come to a standstill.

The operation of the machine will now be readily understood. The molding strip, which constitutes the work, is fed by hand between the guide plate 74 up to the embossing roll 72. When the forward end of the strip reaches this point it will be engaged by the embossing roll and forced down by it into close contact with the traveling conveyor or feed chain 74. The advancing conveyor will thenceforward advance the strip and cause the roll 72 to emboss it in accordance with well known principles. From the embossing roll the work passes beneath the shoe 192 and pressure rollers 206 and 230, being confined laterally by the guide plates 194. After leaving roll 230 the work passes beneath shoe 242, at which point the under surface will be acted upon by the rotating planer head 250. Thus it will be evident that the machine not only embosses the molding but also finishes the under side of it in a single pass and with a single handling. If the work jams, or if for any other reason it is desired to quickly release the pressure and stop the machine the attendant throws the lever 70 rearward whereupon, after he has moved it a slight distance, the pressure induced by the embossing roll and the weight of the table will cause the forward end of the table and conveyor to drop sufficiently to release the pressure and simultaneously loosen the belt, as previously explained. Thus it will be seen that both the embossing and the planing action will be accomplished as a result of but a single handling of the work strip. It will also be seen that the releasing and stopping of the machine is semi-automatic in the sense that it is carried on automatically after it is initiated by the operator. By reason of the presence of the adjustable mechanism by which the shaft of the embossing roll is supported, a great variety of forms of molding may be produced.

Having thus described my invention, what I claim as new and desire to secure by Letters Patent is:

1. A woodworking machine having an embossing roll, a frame for guiding the work toward the roll, means for feeding the work along the frame, the frame extending at right angles to the axis of the roll and being approximately tangential to the roll, means for pivotally supporting one end of the frame, and means for controlling the position of the other end of the frame to thereby regulate the pressure of the embossing roll on the work.

2. A woodworking machine having a rotatable tool, and an endless conveyor for feeding the work tangentially past the tool, said conveyor being pivoted at one end whereby it may be swung toward and from the tool axis for holding the work and the tool in contact or releasing the pressure between the work and the tool.

3. An embossing machine having an embossing roll, an endless belt conveyor having its upper run traveling horizontally beneath the roll for feeding the work to it, the conveyor at one end being pivotally supported about a fixed horizontal axis and at the other end being vertically movable, for swinging the free end of the conveyor vertically for causing or releasing pressure between the roll and the work.

4. An embossing machine having an embossing roll, a conveyor belt traveling tangentially past the roll for feeding the work to it, a frame on which the conveyor belt is mounted, and an adjustable element mounted in the frame in juxtaposition to the roll and adapted to back up a portion of the conveyor belt, said adjustable element being movable toward and from the roll axis independently of the frame for regulating the degree of pressure between the roll and the work.

5. An embossing machine having an embossing roll, a frame pivoted at one end so as to rotate about a fixed axis, an endless belt conveyor mounted on the frame for feeding work tangentially past the embossing roll, said frame having a platen upon which the portion of the conveyor momentarily contiguous to the roll may be backed up, to thereby create pressure between the work and the embossing roll, and a manually operated eccentric for swinging the free end of the frame about its pivot, to quickly release the pressure between the work and the embossing tool in the case of emergency.

6. In an embossing machine, an embossing roll, a conveyor for feeding the work tangentially past the roll, controlling means for moving the conveyor radially away from the roll axis to relieve the pressure of the work against the roll, and driving means for said conveyor also under the control of said controlling means whereby when the conveyor is moved away from the roll it will be simultaneously stopped.

7. In an embossing machine, an embossing roll, means for feeding the work tangentially past the roll, a frame for backing up the work, said frame being movable toward and from the roll for increasing and decreasing the pressure of the roll on the work, an eccentric for moving the frame toward and from the roll, and manually operated means adapted to throw the eccentric past center whereby it may lock the frame at a fixed distance from the roll axis.

8. In an embossing machine an embossing roll, a conveyor for advancing the work, a frame backing up the conveyor for holding the work in tangential proximity to said roll, an eccentric for throwing one end of the frame towards and from the roll, and manually operated means for operating said eccentric, said manually operated means being adapted to throw the eccentric past center whereby it may lock the frame at a fixed distance from the roll axis.

9. In an embossing machine, an embossing roll a conveyor for feeding the work in tangential proximity to said roll a frame backing up the conveyor, an eccentric for throwing one end of the conveyor towards and from the roll, and manually operated means for operating said eccentric, said manually operated means being adapted to throw the eccentric past center whereby it may lock the work supporting means at a fixed distance from the roll axis, said eccentric being freely movable after it has been rotated backward past center from the locking position, whereby the pressure of the embossing roll on the work will complete the release as soon as the operator has rotated the eccentric slightly past center in the releasing direction.

In witness whereof, I have hereunto subscribed my name.

WILLIAM H. FORSYTH.